US008137456B2

(12) United States Patent
Van Trier et al.

(10) Patent No.: US 8,137,456 B2
(45) Date of Patent: Mar. 20, 2012

(54) PROCESS FOR THE PREPARATION OF SULPHUR CEMENT OR A SULPHUR CEMENT-AGGREGATE COMPOSITE

(75) Inventors: Rob Aloysius Maria Van Trier, Eindhoven (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 897 days.

(21) Appl. No.: 11/608,062

(22) Filed: Dec. 7, 2006

(65) Prior Publication Data
US 2007/0186823 A1    Aug. 16, 2007

(30) Foreign Application Priority Data
Dec. 9, 2005   (EP) .................................... 05111872

(51) Int. Cl.
C04B 14/04    (2006.01)
C04B 18/02    (2006.01)
C04B 22/02    (2006.01)
C04B 24/42    (2006.01)

(52) U.S. Cl. .............. 106/815; 106/287.13; 106/287.32; 106/287.35; 106/806

(58) Field of Classification Search ............ 106/287.35, 106/725, 806, 287.13, 287.32, 815
See application file for complete search history.

(56) References Cited

U.S. PATENT DOCUMENTS

| 4,000,347 | A | * | 12/1976 | Ranney et al. ................. 428/419 |
| 4,164,428 | A |   | 8/1979  | Simic ........................ 106/287.13 |
| 4,376,830 | A | * | 3/1983  | Nimer et al. ................... 501/140 |
| 6,194,594 | B1 |  | 2/2001  | Görl et al. ..................... 556/427 |
| 2003/0114577 | A1 | * | 6/2003 | Yatsuyanagi et al. ......... 524/495 |

FOREIGN PATENT DOCUMENTS

| GB | 2139202 | 11/1984 |
| WO | WO02059193 A1 | 8/2002 |
| WO | 2005/059016 | 6/2005 |

OTHER PUBLICATIONS

Nasir et al., The Effect of γ-Mercaptopropyltrimethoxysilane Coupling Agent on t90, Tensile Strength and Tear Strength of Silica-Filled ENR Vulcanisates, 1989, Eur. Polym. J., vol. 25, No. 3, pp. 267-273.*

Nasir M et al: "Effect of gamma-mercaptopropyltrimethoxysilane coupling strength of silica-filled ENR vulcanisates" Eur Polym J; European Polymer Journal 1989, vol. 25, No. 3, 1989, pp. 267-273, XP002390492. Introduction.
Gorl, U.; Munzenberg, J.; Luginsland, D.; Muller, A. Investigations on the reaction silica/organosilane and organosilane/polymer. Part 4. Studies on the chemistry of the silane-sulfur chain. Pulver Kautschuk Union G.m.b.H., Marl, Germany. Kautschuk Gummi Kunststoffe (1999), 52(9), 588-592,594-598. Publisher: Huethig GmbH, CODEN: KGUKAC ISSN: 0022-9520. Journal written in English. CAN 132:123896 AN 1999:662597. CAPLUS.
Debnath, S. C.; Datta, R. N.; Noordermeer, J. W. M. Understanding the chemistry of the rubber /silane reaction for silica reinforcement, using model olefins. Dutch Polymer Institute (DPI), Faculty of Science and Technology, Twente University, Enschede, Neth. Rubber Chemistry and Technology (2003), 76(5), 1311-1328. Publisher: American Chemical Society, Rubber Division, CODEN: RCTEA4 ISSN: 0035-9475. Journal written in English. CAN 140:305199 AN 2004:15687 CAPLUS.
Reuvekamp, L. A. E. M.; ten Brinke, J. W.; van Swaaij, P. J.; Noordermeer, J. W. M. Effects of mixing conditions. Reaction of TESPT silane coupling agent during mixing with silica filler and tire rubber. Enschede, Neth. Kautschuk Gummi Kunststoffe (2002), 55(1-2), 41-47. Publisher: Huethig GmbH & Co. KG, CODEN: KGUKAC ISSN: 0022-9520. Journal written in English. CAN 138:189182 AN 2002:938036 CAPLUS.

* cited by examiner

Primary Examiner — Jerry Lorengo
Assistant Examiner — Jared Wood
(74) Attorney, Agent, or Firm — Charles W. Stewart

(57) ABSTRACT

The present invention provides a process for the preparation of sulphur cement or a sulphur cement-aggregate composite comprising the following steps:
(a) admixing at least an inorganic filler and/or aggregate and a polysulphide-containing organosilane having at least two organosilyl groups and allowing the organosilane to react with the inorganic filler and/or aggregate;
(b) admixing during or after step (a) elemental sulphur with the inorganic filler and/or aggregate at a temperature at which sulphur is liquid to obtain an admixture comprising molten sulphur and inorganic filler and/or aggregate; and
(c) solidifying the admixture to obtain sulphur cement or a sulphur cement-aggregate composite.
The invention further provides sulphur cement or a sulphur cement-aggregate composite obtainable by such process and the use of a polysulphide-containing organosilane having at least two organosilyl groups as coupling agent in sulphur cement or a sulphur cement-aggregate composite.

30 Claims, No Drawings

PROCESS FOR THE PREPARATION OF SULPHUR CEMENT OR A SULPHUR CEMENT-AGGREGATE COMPOSITE

CROSS-REFERENCE TO RELATED APPLICATION

This application claims priority from European Patent Application No. 05111872.7, filed on Dec. 9, 2005, which is incorporated herein by reference.

FIELD OF THE INVENTION

The present invention provides a process for the preparation of sulphur cement or a sulphur cement-aggregate composite, sulphur cement or a sulphur cement-aggregate composite obtainable by such process and the use of a polysulphide-containing organosilane having at least two organosilyl groups as coupling agent in sulphur cement or a sulphur cement-aggregate composite.

BACKGROUND OF THE INVENTION

Sulphur cement generally refers to a product comprising at least sulphur, usually in an amount of at least 50 wt %, and a filler. Sulphur cement may be plasticised by the addition of a sulphur cement modifier in the sulphur cement preparation process. Such modifiers are known in the art. Examples of such modifiers are aliphatic or aromatic polysulphides or compounds that form polysulphides upon reaction with sulphur. Examples of compounds that form polysulphides are naphthalene or olefinic compounds such as dicyclopentadiene, limonene or styrene. Modifiers are usually added in an amount in the range of from 0.1 to 10 wt % based on the weight of sulphur. Usual sulphur cement fillers are particulate inorganic material with an average particle size in the range of from 0.1 μm to 0.1 mm. Examples of such sulphur cement fillers are fly ash, limestone, quartz, iron oxide, alumina, titania, graphite, gypsum, talc, mica or combinations thereof. The filler content of sulphur cement may vary widely, but is typically in the range of from 5 to 50 wt %, based on the total weight of the cement.

Sulphur cement-aggregate composites generally refer to a composite comprising both sulphur cement and aggregate. Examples of sulphur cement-aggregate composites are sulphur mortar, sulphur concrete and sulphur-extended asphalt. Mortar comprises fine aggregate, typically with particles having an average diameter between 0.1 and 5 mm, for example sand. Concrete comprises coarse aggregate, typically with particles having an average diameter between 5 and 40 mm, for example gravel or rock. Sulphur-extended asphalt is asphalt, i.e. typically aggregate with a binder that contains filler and a residual hydrocarbon fraction, wherein part of the binder has been replaced by sulphur, usually modified sulphur.

It is known to use organosilane as a stabilising agent in sulphur cement or sulphur cement-aggregate compositions to improve water stability. In U.S. Pat. No. 4,164,428 for example, a plasticized sulphur composition comprising at least 50% by weight of sulphur, a sulphur plasticizer, a finely divided particulate mineral suspending agent, and an organosilane stabilising agent is disclosed. It is mentioned that suitable organosilanes have the general molecular formula R—Si(OR')$_3$, wherein R' is a low molecular weight alkyl group and R is an organic radical having at least one functional group, usually bonded to the silicon atom by a short alkyl chain. Gamma-mercaptopropyltrimethoxysilane is mentioned as a preferred organosilane.

In U.S. Pat. No. 4,376,830 a sulphur cement-aggregate composition comprising a sulphur cement and an aggregate containing an expansive clay and processes for preparing such compositions are disclosed. The processes, and resulting compositions, are characterised by the addition of certain organosilanes in the composition prior to solidifying (cooling) the composition. The resulting solidified composition has improved water stability. It is mentioned that suitable organosilanes have the formula Z—Si(R$^1$R$^2$R$^3$), wherein R$^1$, R$^2$ and R$^3$ may be lower alkoxy groups and Z is an organic radical attached to Si via a carbon atom and has at least one molten-sulphur reactive group. Z may for example be mercaptoalkyl. Gamma-mercaptopropyltrimethoxysilane is mentioned as a preferred organosilane.

Disadvantages of the use of gamma-mercaptopropyltrimethoxysilane are that it is very toxic and that it has a very unpleasant smell.

SUMMARY OF THE INVENTION

It has now been found that the use of a different group of organosilanes, i.e. polysulphide-containing organosilanes having at least two organosilyl groups, in the preparation of sulphur cement or sulphur cement-aggregate composites, results in sulphur cement or sulphur cement-aggregate composites with improved properties.

Accordingly, the present invention provides a process for the preparation of sulphur cement or a sulphur cement-aggregate composite comprising the following steps:

(a) admixing at least an inorganic filler and/or aggregate and a polysulphide-containing organosilane of the general molecular formula $$(X_3Si)_m H_{(2n+1-m)} C_n - S_a - C_{n'} H_{(2n'+1-m')} (SiX'_3)_{m'} \quad (1)$$

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1), and allowing the organosilane to react with the inorganic filler and/or aggregate;

(b) admixing during or after step (a) elemental sulphur with the inorganic filler and/or aggregate at a temperature at which sulphur is liquid to obtain an admixture comprising molten sulphur and inorganic filler and/or aggregate; and (c) solidifying the admixture to obtain sulphur cement or a sulphur cement-aggregate composite.

The invention further provides sulphur cement or a sulphur cement-aggregate composite obtainable by a process as hereinbefore defined.

In a still further aspect, the invention provides the use of a polysulphide-containing organosilane of the general molecular formula (1) as defined hereinabove as coupling agent in sulphur cement or a sulphur cement-aggregate composite.

An advantage of the use of a polysulphide-containing organosilane with at least two organosilyl groups as compared to the known use of gamma-mercaptopropyl-trimethoxysilane as coupling agent in sulphur cement or sulphur cement-aggregate composites is that the water uptake of the cement or cement-aggregate composite is significantly lower.

Another advantage of the use of a polysulphide-containing organosilane with at least two organosilyl groups is that it also acts as a sulphur modifier. Therefore, it is possible to prepare sulphur cement or a sulphur cement-aggregate composite with less sulphur modifier than usual or even without sulphur modifier whilst achieving the desired degree of sulphur modification or plastification.

Another advantage is that the sulphur cement prepared according to the invention has improved mechanical properties as compared to sulphur cement prepared with other organosilanes, for example gamma-mercaptopropyl-trimethoxysilane.

Further advantages of the use of a polysulphide-containing organosilane with at least two organosilyl groups are that it has a far lower toxicity than gamma-mercaptopropyl-trimethoxysilane and that it has no unpleasant smell.

DETAILED DESCRIPTION OF THE INVENTION

In the process according to the invention, sulphur cement or a sulphur cement-aggregate composite is prepared by admixing at least an inorganic ingredient with a polysulphide-containing organosilane of the general molecular formula (1) and allowing the organosilane to react with the inorganic ingredient (step (a)). During or after step (a), elemental sulphur and optionally further ingredients are admixed with the inorganic ingredient and the organosilane at a temperature at which sulphur is liquid (step (b)) to obtain an admixture comprising molten sulphur and the inorganic filler and/or aggregate. Then, in step (c), the admixture as obtained in step (b) is solidified by cooling it to a temperature below the melting temperature of sulphur to obtain sulphur cement or a sulphur cement-aggregate composite.

In step (a), at least an inorganic ingredient, i.e. inorganic filler and/or inorganic aggregate, is reacted with the organosilane. In case of a process for the preparation of sulphur cement, the inorganic ingredient is inorganic filler. In the case of a process for the preparation of a sulphur cement-aggregate composite, the inorganic ingredient may be filler, aggregate or both. The inorganic filler or aggregate that is reacted with the organosilane in step (a) may be any inorganic filler known to be suitable as sulphur cement filler or any aggregate that can suitably be used in sulphur cement-aggregate composites. Preferably, the inorganic ingredient that is reacted with the organosilane in step (a) has oxide or hydroxyl groups on its surface. Examples of such fillers are fly ash, limestone, quartz, iron oxide, alumina, titania, carbon black, gypsum, talc or mica. Examples of such aggregate are sand, gravel, rock or metal-silicates. Such metal silicates are for example formed upon heating heavy metal containing sludge in order to immobilise the metals. More preferably the inorganic ingredient is a silicate. Examples of such silicates are quartz, sand, metal-silicates, and mica.

In the case that metal-silicates that are formed by heating sludge for heavy metal immobilisation are used as aggregate, the heat that is available in the heated sludge can advantageously be used in the sulphur cement-aggregate composite preparation process according to the invention. This can for example be done by using steam that is generated during cooling of the metal-silicates for heating the elemental sulphur or the ingredients of the process according to the invention.

The conditions under which the inorganic ingredient is admixed with the organosilane are such that the organosilane is allowed to react with the inorganic material. Preferably, the temperature at which inorganic material and organosilane are admixed is in the range of from 120 to 150° C., preferably 125 to 140° C. The reaction time is typically in the range of from 20 minutes to 3 hours, preferably of from 30 minutes to 2 hours.

The organosilane may be admixed as such with the inorganic ingredient, for example by spraying it onto the inorganic ingredient. Preferably, the organosilane is dissolved in a small amount of solvent, for example an alcohol or a hydrocarbon, in order to facilitate the admixing with the inorganic ingredient. The solvent preferably has a boiling point below the temperature at which step (a) is performed in order to allow the solvent to evaporate during the admixing in step (a).

Sulphur, and optionally further ingredients such as sulphur modifiers, or further inorganic filler or aggregate, are admixed with the inorganic ingredient and the organosilane in step (b).

In case the process is a process for preparing sulphur-extended asphalt, at least sulphur and bitumen are admixed with the inorganic ingredient in step (b). In that case, the sulphur is preferably admixed in combination with a $H_2S$ suppressant or scavenger, in order to avoid or minimise release of $H_2S$ that may be formed as a result of dehydrogenation reactions between bitumen and sulphur at the admixing temperature. Suitable $H_2S$ suppressants or scavengers are known in the art, for example from WO 2005/059016, and include free radical inhibitors and redox catalysts. Preferably, the sulphur is in step (b) admixed by adding pellets comprising elemental sulphur and $H_2S$ suppressants to the inorganic ingredient and bitumen that are already heated to the admixture temperature of 120-180° C. Reference is made in this respect to WO 2005/059016, wherein such pellets and this way of preparing sulphur-extended asphalt are described in more detail.

The admixing in step (b) is carried out at a temperature at which sulphur is liquid, i.e. typically above 120° C., preferably in the range of from 120 to 180° C., more preferably in the range of from 130 to 170° C.

Step (b) may be performed during or after step (a). If step (b) is performed during step (a), all ingredients of the sulphur cement or the sulphur cement-aggregate composite are admixed at a temperature at which sulphur is liquid. Preferably, step (a) is performed prior to step (b) in order to allow the organosilane to react with the inorganic filler and/or aggregate before sulphur is added.

A sulphur modifier may be added in step (b). Sulphur modifiers, often referred to as sulphur plasticisers, are known in the art. Any sulphur modifier known in the art may be suitably applied. An example of a known class of suitable sulphur modifiers are olefinic compounds that co-polymerise with sulphur. Known examples of such olefinic sulphur modifiers are dicyclopentadiene, limonene or styrene. It is an advantage of the process according to the invention that less or even no sulphur modifier is needed as compared to sulphur cement preparation processes wherein no or a different organosilane is used.

The amount of organosilane that is admixed with the inorganic ingredient in step (a) is preferably in the range of from 0.01 to 0.2 wt % based on the weight of inorganic filler and aggregate in the sulphur cement or sulphur cement-aggregate composite, more preferably in the range of from 0.02 to 0.1 wt %. In case further inorganic filler and/or aggregate is admixed in step (b), the amount of organosilane is to be based on the total weight of filler and aggregate in the final product, i.e. including the filler and aggregate added in step (b).

In an alternative process according to the invention, the sulphur cement or sulphur cement-aggregate composite is prepared by admixing, at a temperature at which sulphur is liquid, elemental sulphur with an inorganic filler and/or aggregate that has already been reacted with an organosilane according to general molecular formula (1). Other ingredients, for example sulphur modifiers, further filler or aggregate, or bitumen may also be admixed. An admixture comprising molten sulphur and reacted inorganic filler and/or aggregate is thus obtained, which is solidified by cooling it. Silica that has already been reacted with an organosilane according to general molecular formula (1) is commercially available from Degussa as Coupsil®.

The organosilane is a polysulphide-containing organosilane having at least two organosilyl groups having the general molecular formula $$(X_3Si)_m H_{(2n+1-m)} C_n - S_a - C_{n'} H_{(2n'+1-m')} (SiX'_3)_{m'} \quad (1)$$

In general molecular formula (1), a is an integer in the range of from 2 to 8, preferably of from 2 to 6. X and X' each are, independently, a hydrolysable group, preferably a halogen, alkoxy, acyloxy or aryloxy group, more preferably a lower alkoxy group, for example methoxy or ethoxy. n and n' each are, independently, an integer in the range of from 1 to 4, and m and m' each are, independently, an integer in the range of from 1 to (2n+1). Preferably n has the same value as n' and m preferably has the same value as m'. Preferably, m and m' both are 1 or 2, more preferably both m and m' are 1. X is preferably the same hydrolysable group as X'. Particularly Preferred Organosilanes are bis(3-triethoxysilylpropyl)tetrasulphide, bis(3-trimethoxysilylpropyl)disulphide, bis(3-trimethoxysilylpropyl)trisulphide, bis(3-trimethoxysilylpropyl)tetrasulphide.

EXAMPLES

The invention is further illustrated my means of the following non-limiting examples.

Example 1

Preparation of Mortar Cylinders

Six different sulphur mortars were prepared, each from 27.83 grams of dried sand (Normsand) as aggregate, 16.83 grams of quartz as filler and 10.35 grams of sulphur. In the preparation of mortar 1, no organosilane was used. In the preparation of mortars 2 to 6, at least one of the filler or the aggregate was pretreated with an organosilane.
Sulphur Mortar 1 (not According to the Invention)
Sand, quartz and sulphur were mixed at 150° C. until an homogeneous mixture was obtained. The mixture was then poured in a steel cylindrical mould that was pre-heated to 150° C. Pressure was applied (0.25-0.5 tons) until droplets of sulphur were visible at the bottom of the mould. The thus-formed mortar cylinder was then demoulded. The cylinders had a diameter of 30 mm.
Sulphur Mortar 2 (According to the Invention)
16.83 grams of quartz were pre-treated with 0.0275 grams of bis(3-triethoxysilylpropyl)tetrasulphide (TESPT). The TESPT was added to the quartz and an amount of ethanol sufficient to completely wet the quartz particles was added. The mixture was then dried at 70-80° C. until the ethanol was evaporated. The mixture was then heated to 130° C. and kept for one hour at that temperature in order to allow the TESPT to react with the quartz. Sand and liquid sulphur were added and admixed with the other ingredients for approximately 5 minutes at 150° C. The liquid mortar mixture was then poured in a steel cylindrical mould that was pre-heated to 150° C. and mortar cylinders were formed as described above for mortar 1.
Sulphur Mortar 3 (According to the Invention)
16.83 grams of quartz and 27.83 grams of dried Normsand were pre-treated with 0.0275 grams of TESPT. The quartz and sand were mixed and the TESPT was added. An amount of ethanol sufficient to completely wet the quartz and sand particles was added. The mixture was then dried at 70-80° C. until the ethanol was evaporated. The mixture was then heated to 130° C. and kept for one hour at that temperature in order to allow the TESPT to react with the quartz and sand. Liquid sulphur was added and admixed with the other ingredients for approximately 5 minutes at 150° C. Mortar cylinders were made as described above for mortar 1.
Sulphur Mortar 4 (According to the Invention)
As mortars 2 and 3, but now only the sand is pre-treated with TESPT.
Sulphur Mortar 5 (not According to the Invention)
As mortar 4, but now the sand is pre-treated with 0.0275 grams of 3-trimethoxysilylpropane-1-thiol instead of TESPT.
Sulphur Mortar 6 (not According to the Invention)
As mortar 4, but now the sand is pre-treated with 0.0275 grams of 3-trimethoxysilylpropyl methacrylate instead of TESPT.
Water Absorption
Cylinders of sulphur mortars 1 to 6 were immersed in water for 2 days. The mass increase was determined. In Table 1, the results are shown.

The mortars prepared with TESPT (mortars 2 to 4) have a significantly lower water uptake than mortars prepared with organosilanes with a single functionalised organosilyl group (mortars 5 and 6). It is believed that this reflects an improved bonding between filler/aggregate and sulphur.

Example 2

Three different sulphur mortars were prepared, each from 27.83 grams of dried sand (Normsand) as aggregate, 16.83 grams of quartz as filler and 10.35 grams of sulphur. In the preparation of all three mortars, the aggregate (sand) was pre-treated with an organosilane. In the preparation of mortar 7 (according to the invention), 0.0330 grams of TESPT were added to the sand; in the preparation of mortar 8 (according to the invention), 0.0893 grams of TESPT were added to the sand; in the preparation of mortar 9 (not according to the invention) 0.0330 grams of 3-trimethoxysilylpropane-1-thiol were added to the sand. The mortars were prepared as described above for mortars 4 and 5.

The compressive strength and E-modulus under compression of cylinders of mortars 7 and 9 were determined in a stress-controlled compression test using a Zwick controller TT0727 with a 300 kN load cell, a test speed of 2.4 kN/s, a pre-load of 119.64 kN and a pre-load speed of 2.4 kN/s. The compressive strength (in N/mm$^2$) and the E-modulus (in MPa) are shown in Table 2.

Bars of 40×40×160 mm were prepared of sulphur mortars 7 and 8. The flexural strength (in N/mm$^2$) of the bars was determined in a three-point loading experiment with an increasing loading (0.05 kN/s). The results are shown in Table 2.

Example 3

Two different samples of sulphur-extended asphalt were prepared. Sample 1 (according to the invention) was prepared using aggregate pre-treated with TESPT. Sample 2 (comparative example) was prepared using the same aggregate without pre-treatment.
Preparation of Organosilane-Treated Aggregate
A 19 mm dense-grade Cambridge dolomitic limestone aggregate was treated with TESPT as follows. To 7.5 kilograms of preheated (130° C.) limestone aggregate, 6 grams TESPT diluted in 50 grams of ethanol were added. The admixture was stirred until the aggregate particles were completely wetted by the TESPT solution. The mixture was then kept at 130° C. for one hour in order to allow the TESPT to react with the limestone. The reacted limestone was then cooled to room temperature and stored for later use.

Preparation of Sulphur-Extended Asphalt

Sulphur-extended asphalt samples were prepared as follows. Pre-heated (165° C.) bitumen was mixed with pre-heated (165° C.) aggregate for 30 seconds and then pellets comprising elemental sulphur with a $H_2S$ suppressant were added. The resulting admixture had a temperature of 145° C. The admixture was then solidified by cooling to room temperature. The resulting sulphur-extended asphalt comprised 3.8 wt % bitumen, 2.5 wt % sulphur and the balance aggregate.

For sample 1, dolomitic limestone pre-treated with TESTP as described above was used. For sample 2, the dolomitic limestone as such was used.

Testing of Sulphur-Extended Asphalt Samples

The moisture sensitivity of the sulphur-extended asphalt was determined by measuring the binder (bitumen and sulphur) film detachment from the aggregate after immersion of loose asphalt in water and by measuring the change in tensile strength of compacted asphalt after water saturation and freeze-thaw cycling. The binder film detachment was measured by placing the 5-10 mm sized fraction of the loose asphalt in Erlenmeyer flasks and covering it with distilled water at room temperature. The flasks were shaken for 24 hours at 200 rpm. The binder film detachment was then determined visually. The observation error is ±5%. The results are shown in Table 3.

The ratio between the wet tensile strength (after water immersion for 24 hours and freeze-thaw cycling) and the dry tensile strength of compacted asphalt samples was determined in accordance with ASTM D4867. The asphalt samples were compacted to an air void fraction of 7±1% and allowed to cure under ambient conditions for 14 days. The dry tensile strength of one subset of the samples was measured. Another subset of the samples was immersed in water for 24 hours and then subjected to a freeze-thaw cycle before its tensile strength was measured. The wet/dry tensile strength ratio of the two samples is given in Table 3.

TABLE 1

Water absorption of mortars 1 to 6

| mortar | Organosilane | pre-treated inorganic material | mass increase (%) |
|---|---|---|---|
| 1 | None | none | 0.73 |
| 2 | TESPT | quartz | <0.01 |
| 3 | TESPT | sand + quartz | <0.01 |
| 4 | TESPT | sand | <0.01 |
| 5 | 3-trimethoxysilylpropane-1-thiol* | sand | 0.14 |
| 6 | 3-trimethoxysilylpropyl methacrylate | sand | 0.14 |

*3-trimethoxysilylpropane-1-thiol is the IUPAC name for gamma-mercaptopropyltrimethoxysilane.

TABLE 2

Mechanical properties of sulphur mortars

| Mortar | organo-silane | organo-silane conc$^a$ (wt %) | compressive strength (N/mm$^2$) | E-modulus (MPa) | flexural strength (N/mm$^2$) |
|---|---|---|---|---|---|
| 7 | TESPT | 0.07 | 80.7 | 11380 | 15.1 |
| 8 | TESPT | 0.20 | | | 10.9 |
| 9 | TMSP-1-thiol$^b$ | 0.07 | 70.0 | 11116 | |

$^a$organosilane concentration in weight % based on the total weight of the filler and aggregate
$^b$TMSP-1-thiol: 3-trimethoxysilylpropane-1-thiol

TABLE 3

Moisture sensitivity of sulphur-extended asphalt samples

| asphalt sample | Organo-silane | % of binder detached from aggregate | tensile strength (kPa) dry | tensile strength (kPa) wet | ratio (%) | % air voids dry | % air voids wet |
|---|---|---|---|---|---|---|---|
| 1 | TESPT | 15 | 501 | 474 | 95 | 6.3 | 6.3 |
| 2 | None | 20 | 469 | 273 | 58 | 7.0 | 6.8 |

What is claimed is:

1. A process for the preparation of sulphur concrete, wherein the process comprises the following steps: (a) admixing at least an inorganic filler and/or aggregate and a polysulphide-containing organosilane, bis(3-triethoxysilylpropyl) tetrasulphide, and allowing the polysulphide-containing organosilane to react with the inorganic filler and/or aggregate; (b) admixing during or after step (a) elemental sulphur with the inorganic filler and/or aggregate at a temperature at which sulphur is liquid to obtain an admixture comprising molten sulphur and inorganic filler and/or aggregate; and (c) solidifying the admixture to obtain the sulphur concrete.

2. A process according to claim 1, wherein step (a) is performed prior to step (b).

3. A process according to claim 2, wherein the amount of organosilane admixed with the inorganic filler and/or aggregate is in the range of from 0.01 to 0.2 wt % based on the weight of inorganic filler and aggregate.

4. A process according to claim 3, wherein the filler or aggregate has oxide or hydroxyl groups on its surface.

5. A process according to claim 4, wherein the filler and/or aggregate is a silicate.

6. A process according to claim 5, wherein the polysulphide-containing organosilane is dissolved in a solvent when admixed in step (a) with the inorganic filler and/or aggregate.

7. A process according to claim 6, wherein the organosilane is dissolved in ethanol when admixed in step (a) with the inorganic filler and/or aggregate.

8. A process according to claim 2, wherein the amount of organosilane admixed with the inorganic filler and/or aggregate is in the range of from 0.02 to 0.1 wt % based on the weight of inorganic filler and aggregate, and wherein the filler or aggregate has oxide or hydroxyl groups on its surface.

9. A process according to claim 1, wherein the amount of organosilane admixed with the inorganic filler and/or aggregate is in the range of from 0.01 to 0.2 wt % based on the weight of inorganic filler and aggregate.

10. A process according to claim 9, wherein the filler or aggregate has oxide or hydroxyl groups on its surface.

11. A process according to claim 10, wherein the filler and/or aggregate is a silicate.

12. A process according to claim 11, wherein the polysulphide-containing organosilane is dissolved in a solvent when admixed in step (a) with the inorganic filler and/or aggregate.

13. A process according to claim 12, wherein the organosilane is dissolved in ethanol when admixed in step (a) with the inorganic filler and/or aggregate.

14. A process according to claim 1, wherein the amount of organosilane admixed with the inorganic filler and/or aggregate is in the range of from 0.02 to 0.1 wt % based on the weight of inorganic filler and aggregate, and wherein the filler or aggregate has oxide or hydroxyl groups on its surface.

15. A process for the preparation of sulphur concrete, wherein the process comprises the following steps:
(a) admixing at least an inorganic filler and/or aggregate and a polysulphide-containing organosilane that is bis(3-triethoxysilylpropyl)tetrasulphide and allowing the polysulphide-containing organosilane to react with the inorganic filler and/or aggregate;
(b) admixing during or after step (a) elemental sulphur with the inorganic filler and/or aggregate at a temperature at which sulphur is liquid to obtain an admixture comprising molten sulphur and inorganic filler and/or aggregate; and
(c) solidifying the admixture to obtain the sulphur concrete.

16. A process comprising:
(a) admixing an inorganic ingredient with an organosilane that is bis(3-triethoxysilylpropyl)tetrasulphide, (TESPT) under conditions such that said organosilane is allowed to react with said inorganic ingredient to thereby form a first admixture;
(b) admixing elemental sulphur with said first admixture at a first temperature at which sulphur is liquid to obtain a second admixture comprising molten sulphur and said inorganic ingredient; and
(c) solidifying said second admixture by cooling said second admixture to a second temperature below the melting temperature of sulphur.

17. A process as recited in claim 16, wherein the amount of organosilane admixed with said inorganic ingredient is in the range of from 0.01 to 0.2 wt % based on the weight of said inorganic ingredient.

18. A process as recited in claim 17, wherein said admixing step (a) is conducted at a temperature in the range of from 120 to 150° C.

19. A process as recited in claim 18, wherein said admixing step (b) is conducted at a temperature in the range of from 120 to 180° C.

20. A process as recited in claim 19, wherein said inorganic ingredient is an inorganic filler or an inorganic aggregate or both.

21. A process as recited in claim 20, wherein said inorganic ingredient has an oxide or an hydroxyl group on its surface.

22. A process as recited in claim 21, wherein said organosilane is dissolved in a solvent when admixed with said inorganic ingredient.

23. A process as recited in claim 22, wherein said solvent has a boiling temperature less than the temperature at which admixing step (a) is conducted in order to allow said solvent to evaporate during said admixing step (a).

24. A process comprising: mixing an inorganic ingredient, an organosilane bis(3-triethoxysilylpropyl)tetrasulphide, and sulphur at a first temperature at which said sulphur is liquid and under conditions such that said organosilane reacts with said inorganic material to form an admixture; and cooling said admixture to a second temperature below the melting temperature of sulphur to thereby solidify said admixture.

25. A process as recited in claim 24, wherein the amount of organosilane mixed with said inorganic ingredient and said sulphur is in the range of from 0.02 to 0.1 wt % based on the weight of said inorganic ingredient.

26. A process as recited in claim 25, wherein said first temperature is above 120° C.

27. A process as recited in claim 26, wherein said inorganic ingredient is an inorganic filler or an inorganic aggregate or both.

28. A process as recited in claim 27, wherein said inorganic ingredient has an oxide or an hydroxyl group on its surface.

29. A process as recited in claim 28, wherein said organosilane is dissolved in a solvent when admixed with said inorganic ingredient.

30. A process as recited in claim 29, wherein said solvent has a boiling temperature less than the temperature at which said mixing step is conducted in order to allow said solvent to evaporate during said mixing step.

* * * * *